(12) United States Patent
Elder

(10) Patent No.: US 10,967,318 B1
(45) Date of Patent: Apr. 6, 2021

(54) FILTER ASSEMBLY FOR EASY FITMENT AND REMOVAL OF A FILTER MEDIA

(71) Applicant: Donald Elder, Manchester, MO (US)

(72) Inventor: Donald Elder, Manchester, MO (US)

( * ) Notice: Subject to any disclaimer, the term of this patent is extended or adjusted under 35 U.S.C. 154(b) by 365 days.

(21) Appl. No.: 16/037,657

(22) Filed: Jul. 17, 2018

(51) Int. Cl.
*B01D 46/00* (2006.01)
*B01D 46/42* (2006.01)

(52) U.S. Cl.
CPC ..... *B01D 46/0006* (2013.01); *B01D 46/4227* (2013.01); *B01D 2279/50* (2013.01)

(58) Field of Classification Search
CPC ............ B01D 46/0006; B01D 46/4227; B01D 2279/50; B01D 46/0005; F24F 3/1603
See application file for complete search history.

(56) References Cited

U.S. PATENT DOCUMENTS

| | | | | |
|---|---|---|---|---|
| 2,575,499 | A * | 11/1951 | Manow | B01D 46/10 55/422 |
| 3,626,668 | A * | 12/1971 | Cardiff | B03C 3/155 96/58 |
| 4,701,196 | A * | 10/1987 | Delany | B01D 46/0002 55/481 |
| 7,175,761 | B2 | 2/2007 | Stanhope et al. | |
| 2002/0194824 | A1 * | 12/2002 | Clayton | F24F 3/1603 55/482 |
| 2006/0168925 | A1 * | 8/2006 | Whittemore | B01D 46/0012 55/490 |
| 2010/0139113 | A1 * | 6/2010 | Mackay | D06F 58/22 34/82 |
| 2011/0225939 | A1 * | 9/2011 | Loggins | B01D 46/0005 55/357 |
| 2015/0362196 | A1 * | 12/2015 | Chen | F24C 15/2035 55/437 |

FOREIGN PATENT DOCUMENTS

| | | | |
|---|---|---|---|
| CN | 203370402 U * | 1/2014 | ............ B01D 46/10 |
| WO | 132096 | 8/2016 | |

OTHER PUBLICATIONS

Hi-Temp Brazing, Inc. (2010). Aluminum dip brazing techniques and material requirements. Accessed Sep. 9, 2020 at https://www.hitempbrazing.com/aluminum-dip-braze-techniques-and-material-requirements (Year: 2010).*
CN203370402U_ENG (Espacenet machine translation of Zhang) (Year: 2014).*

* cited by examiner

*Primary Examiner* — Jonathan Miller
*Assistant Examiner* — Gabriel E Gitman
(74) *Attorney, Agent, or Firm* — Sanchelima & Associates, P.A.; Christian Sanchelima; Alexander Rodriguez

(57) ABSTRACT

The present invention is a filter assembly for use in a filter furnace and includes a frame, filter media and housing. Frame has an opening and a handle. Opening of frame facilitates receiving of filter media in frame and removing of filter media from frame. Assembly of frame and filter media is introduced in housing. After receiving of the assembly of frame and filter media, housing is inserted in a confined space provided between an air return duct and a main furnace of filter furnace by pushing handle of frame. During periodic maintenance, handle is pulled to remove housing from the confined space. Assembly of filter media and frame is removed from the housing. Filter media is removed from frame for cleaning or replaced with a new filter media. Frame also secures filter media and prevents filter media from being sucked in a blower motor of main furnace.

9 Claims, 4 Drawing Sheets

FILTER ASSEMBLY FOR EASY FITMENT AND REMOVAL OF A FILTER MEDIA

BACKGROUND OF THE INVENTION

1. Field of the Invention

The present disclosure relates to a furnace filter. More particularly, the present disclosure relates to a filter assembly for easy fitment and removal of a filter media.

2. Description of the Related Art

A furnace filter is positioned in a confined space between an air return duct and a main furnace and a filter media of the furnace filter is required to be periodically removed from the confined space for cleaning or replacement. However, removal of the furnace filter media from the confined space is a tedious task. Hence, there is a need for a filter assembly that facilitates easy removal/replacement of a filter media.

Several designs for filters have been designed in the past. None of them, however, includes a filter assembly that facilitates easy removal/replacement of a filter media from a confined space between an air return duct and a main furnace.

Applicant believes that a related reference corresponds to WIPO patent application 2016132096 filed by ADEY HOLDING LIMITED for a telescopic fitment for a magnetic filter. The patent application '096 discloses a telescopic fitment for a magnetic filter having first and second connectors. Either the first connector or the second connector includes an inner pipe and an outer pipe and the inner pipe is slidable within the outer pipe. However, the telescopic fitment is silent on easy removal/replacement of the magnetic filter.

Another related application is U.S. Pat. No. 7,175,761 filed by Champion Labs Inc for a fluid filter assembly. The patent '761 discloses a housing open at one end with an annular filter media/core assembly disposed in the housing. However, patent '761 is silent on the feature of easy removal/replacement of the filter media.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a filter assembly for use in a filter furnace that facilitates easy removal/replacement of a filter media.

It is an object of the present invention to provide a filter assembly that has a housing to receive an assembly of a frame and a filter media and the frame facilitates easy insertion and removal of the housing in a confined space between an air return duct and a main furnace.

It is an object of the present invention to provide a filter assembly that has a frame with an opening to receive and remove a filter media.

It is an object of the present invention to provide a filter assembly that has a frame with a handle that facilitates easy sliding of a housing in a confined space between an air return duct and a main furnace.

It is an object of the present invention to provide a filter assembly that has a frame for holding a filter media that prevents filter media from being sucked by a blower motor in an operative configuration.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
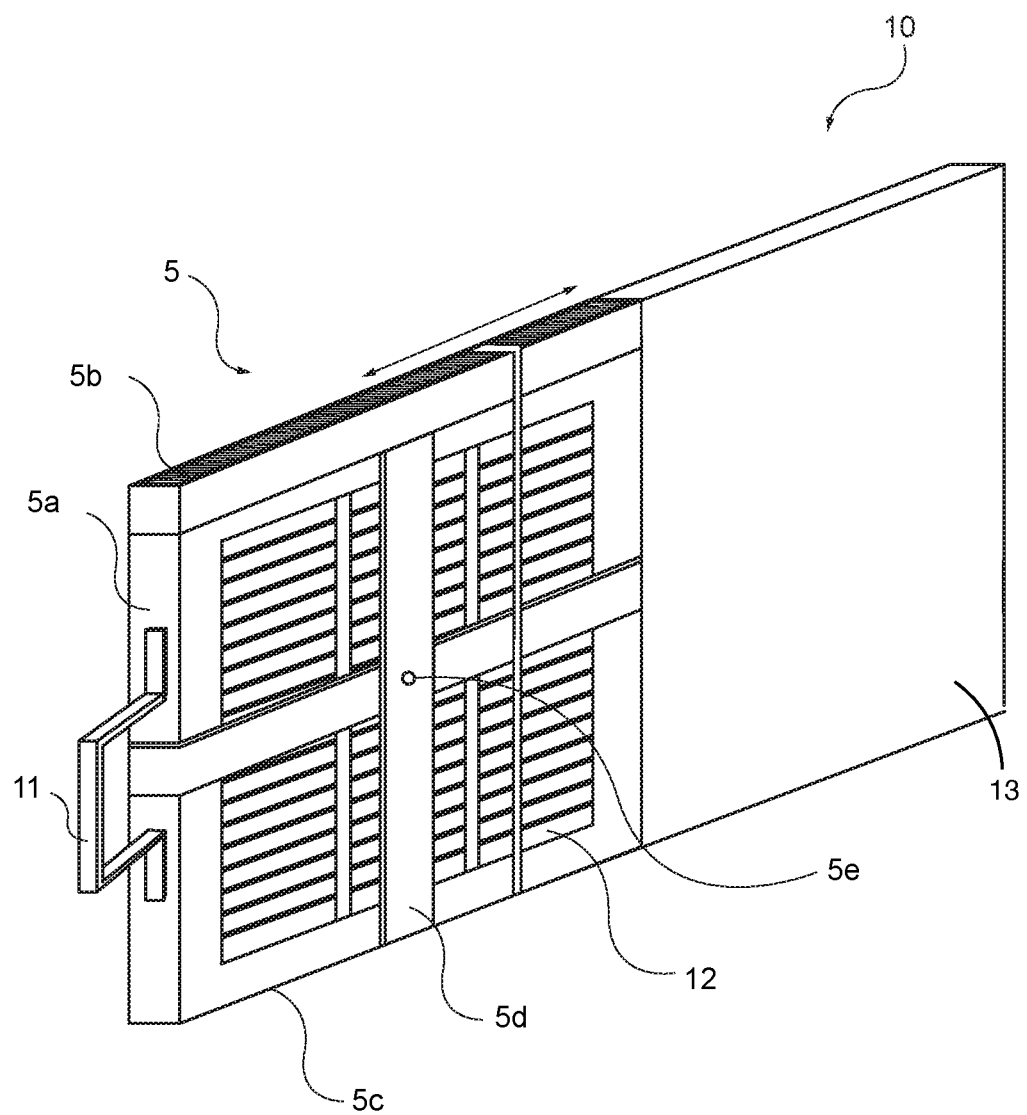
FIG. 1 represents an isometric view of a filter assembly 10 depicting frame 5 and filter media 12 being partially inserted into housing 13.
Figure 2:
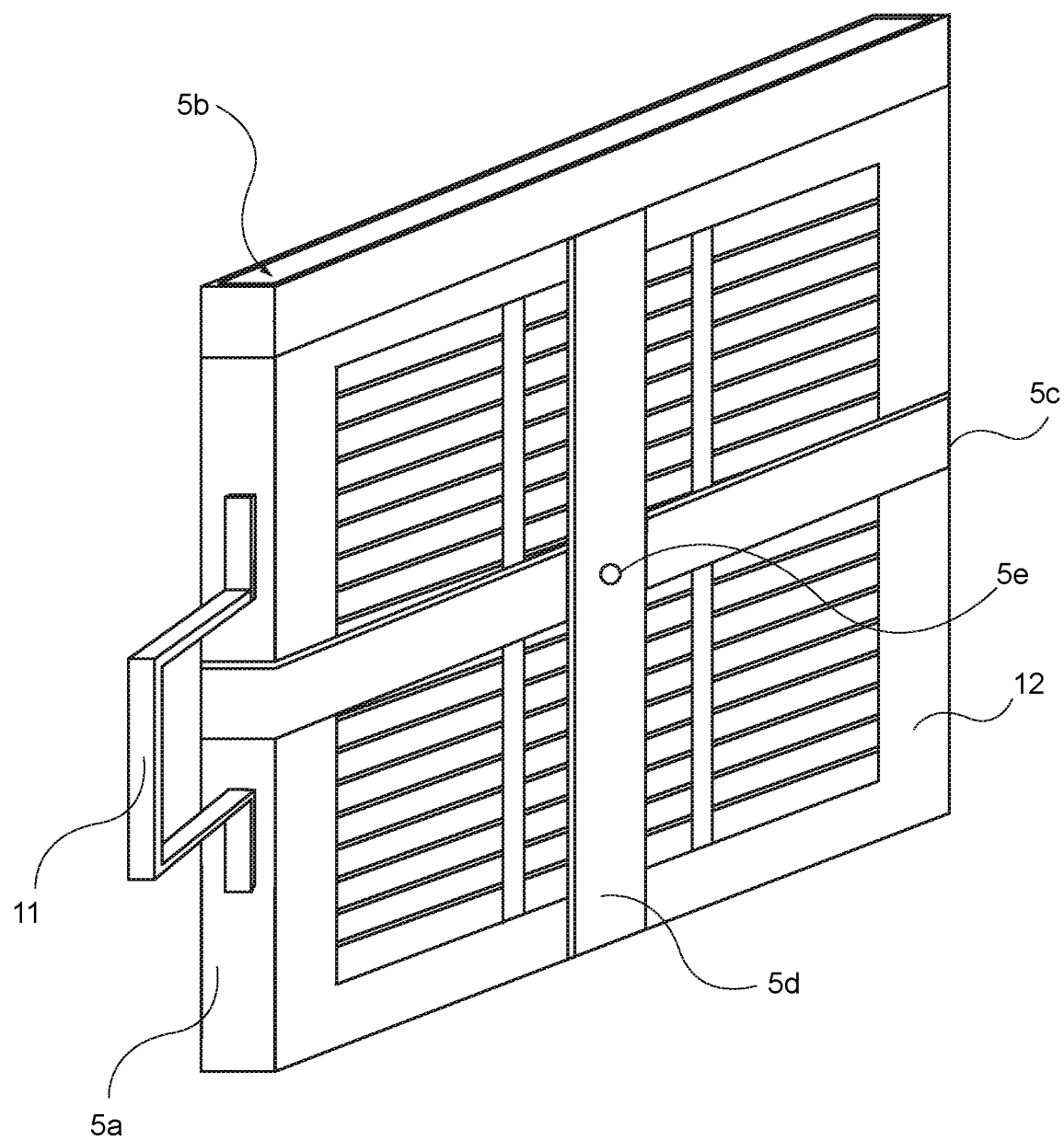
FIG. 2 shows an isometric view of frame 5 completely assembled with filter media 12 of filter assembly 10.
Figure 3:
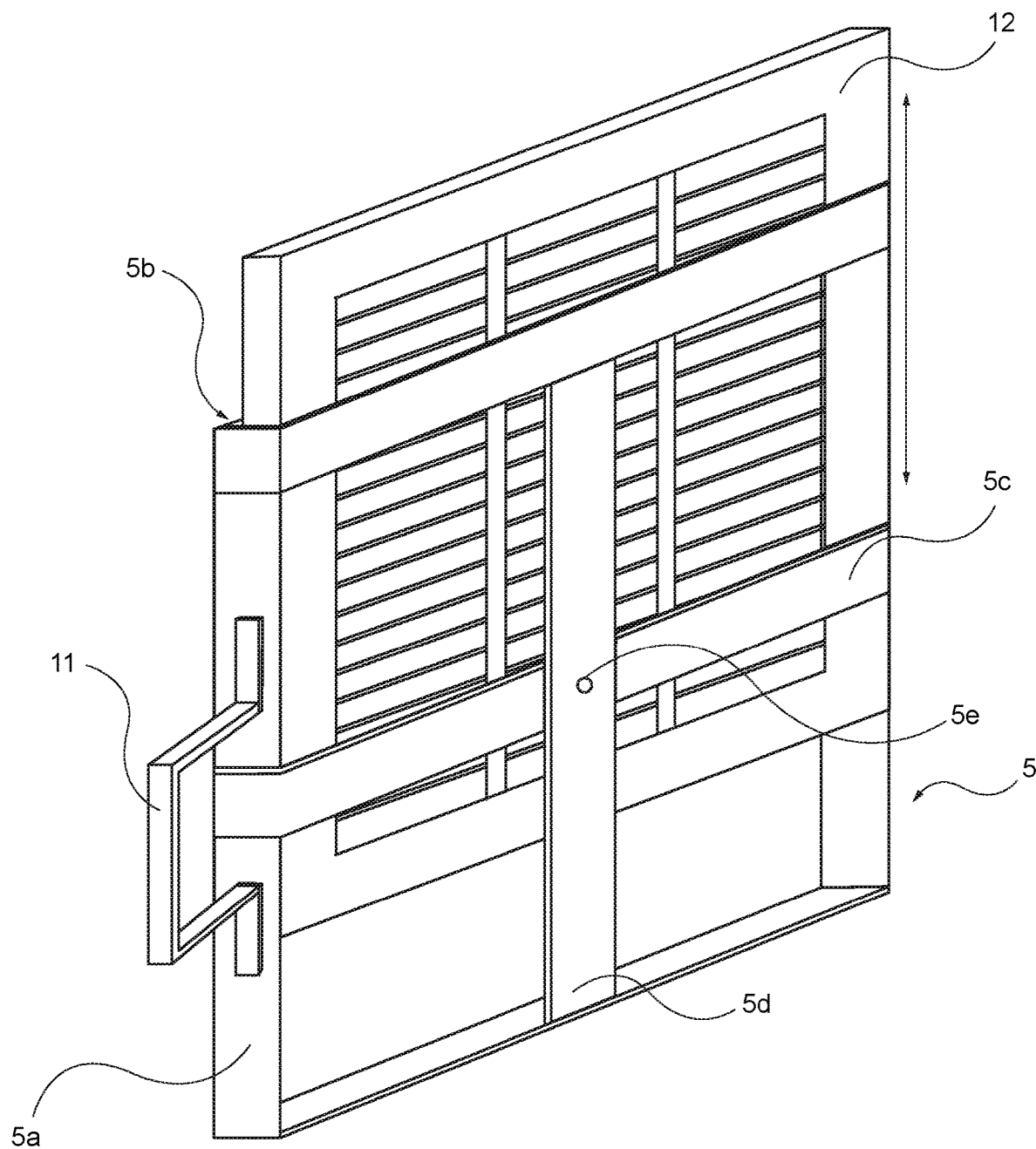
FIG. 3 demonstrates an isometric view of frame 5 partially assembled with a filter media 12 of filter assembly 10.
Figure 4:
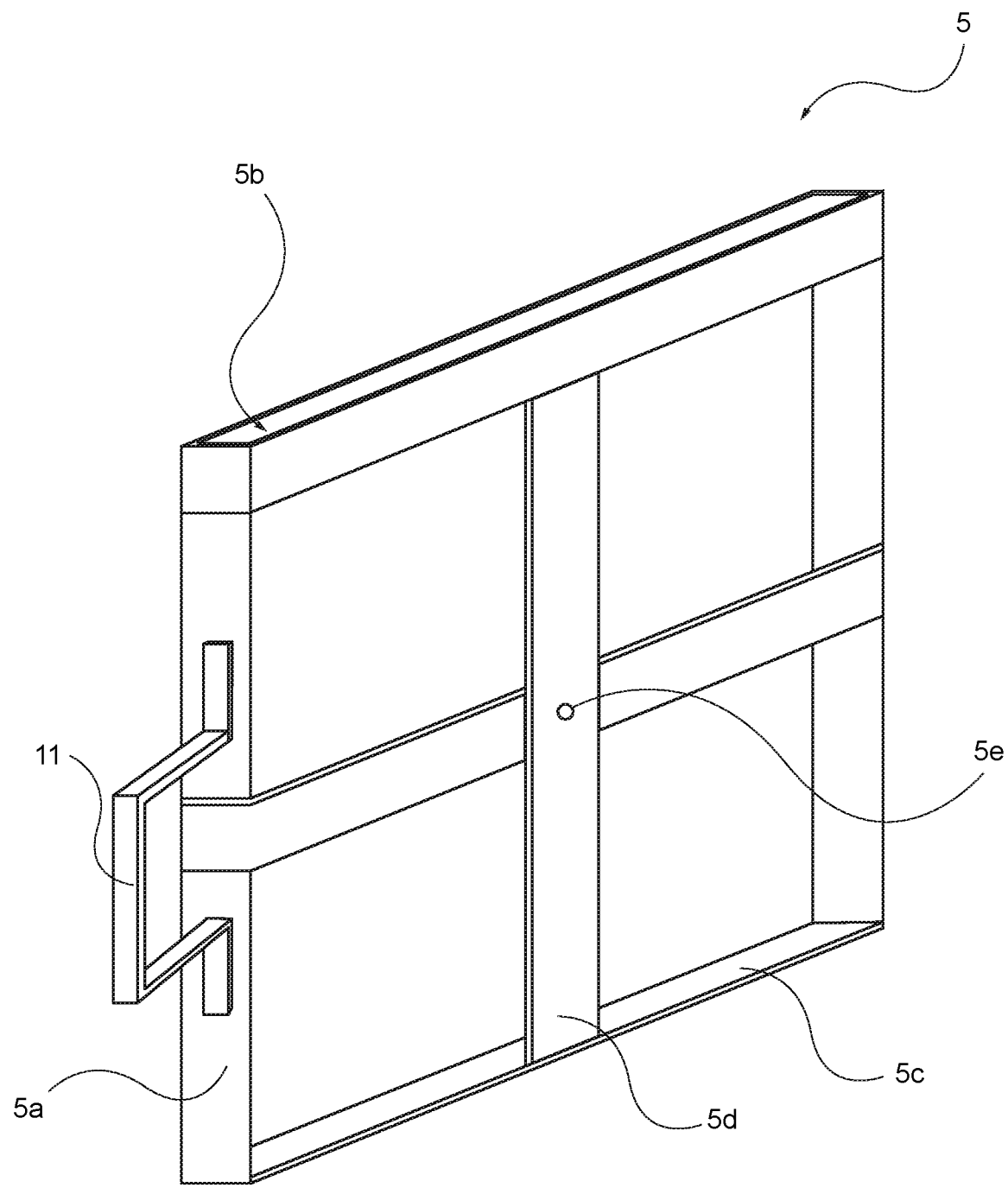
FIG. 4 represents an isometric view of a frame 5 of a filter assembly 10.

Referring now to the drawings, FIGS. 1-4, where the present invention is generally referred to with numeral 10, it can be observed that a filter assembly for use in a filter furnace, in accordance with one embodiment, is provided that includes a frame 5, a replaceable filter media 12 and a housing 13.

Frame 5 is defined with an opening at a first edge 5b and a handle at a second edge 5a. In one embodiment, the frame 5 is formed by assembling a plurality of horizontal elements 5c and a plurality of vertical elements 5d. Plurality of horizontal elements 5c and plurality of vertical elements 5d are connected with each other by using a plurality of fasteners 5e. Alternatively, plurality of horizontal elements 5c and plurality of vertical elements 5d are connected with each other by welding or brazing. In yet other embodiment, plurality of horizontal elements 5c and plurality of vertical elements 5d are connected by fasteners as well as welding/brazing.

Plurality of horizontal elements 5c and plurality of vertical elements 5d are connected with each other such that first edge 5b is left open. In the depicted embodiment, the top edge is defined as first edge 5b which is open. However, a side vertical edge can also be defined as first edge 5b that can be open.

Filter media 12 is inserted in and removed from frame 5 through opening of first edge 5b. Filter media 12 can be removed for cleaning or can be replaced with a new filter media. Filter media 12 is used for filtering air flowing from an air return duct (not illustrated in Figures) to a main furnace (not illustrated in Figures) of filter furnace.

Housing 13 receives the assembly of filter media 12 and the frame 5. In one embodiment, the assembly of filter media 12 and the frame 5 slides in housing 13. Housing 13, assembled with the filter media 12 and the frame 5, is inserted in a confined space between air return duct and main furnace such that air from air return duct flows into main furnace through filter media 12 fitted in housing 13. Insertion of housing 13 in confined space is performed by a user who holds and pushes handle 11. During periodic maintenances of filter media 12, housing 13 is required to be removed from confined space by pulling handle 11. Assembly of filter media 12 and frame 5 is removed from housing 13. Filter media 12 is then removed from frame 5 for cleaning or replacement.

As illustrated, handle 11 is provided on second edge 5a. Second edge 5a can be any of the edges of frame 5 which projects handle 11 outward when housing 13 is positioned in confined space.

Thus, frame 5 facilitates easy insertion and removal of housing 13 of filter media 12 in confined space. Also, frame 5 secures filter media 12 and prevents filter media 12 from being sucked by blower motor provided in main furnace.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A filter assembly comprising:
   a) a frame having a rectangular shape with four lateral side edges, said four lateral side edges including a first edge being a top edge and a second edge being a side edge that is adjacent to the first edge, wherein said frame is enclosed about three of the four lateral side edges, said first edge having a rectangular opening which provides access to an interior portion of the frame, wherein said second edge includes a handle, wherein said frame further includes a plurality of vertical elements and a plurality of horizontal elements, wherein said vertical elements extend from a bottom edge of the frame and extends toward the top proximal edge of the frame, wherein said horizontal elements extend from said second edge and terminate at an opposing side edge being parallel to the second edge, wherein said vertical elements overlap the horizontal elements such that a cross member is formed to define four open rectangular sections of the frame;
   b) a replaceable filter media slidably introduced into the rectangular opening of the first edge to be secured into the interior portion of said frame, wherein said rectangular opening of the first edge cooperates with the shape of the replaceable filter media; and
   c) a housing with a rectangular shape defining a confined space, said confined space accessed from an opening along a side edge of the housing, wherein said frame having the replaceable media therein is slidably insertable into the housing to be enclosed in the confined space.

2. The filter assembly as claimed in claim 1, wherein said horizontal elements and said vertical elements are assembled by a plurality of fasteners.

3. The filter assembly as claimed in claim 1, wherein said horizontal elements and said vertical elements are assembled by welding or brazing.

4. The filter assembly as claimed in claim 1, wherein said horizontal elements and said vertical elements are assembled by fasteners and welding or brazing.

5. The filter assembly as claimed in claim 1, wherein said handle includes a C-shaped portion extending outwardly and away from said second edge.

6. The filter assembly as claimed in claim 5, wherein said C-shaped portion having comprises two attachment members which are in abutting engagement with the second edge.

7. The filter assembly as claimed in claim 5, wherein said C-shaped portion comprises two horizontal members and a vertical member.

8. The filter assembly as claimed in 1, wherein said replaceable filter media is removable from the interior portion of said frame to aid a user in cleaning or replacing the replaceable filter media.

9. A filter assembly, consisting of:
   a) a frame having a rectangular shape with four lateral side edges, said four lateral side edges including a first edge being a top edge and a second edge being a side edge that is adjacent to the first edge, wherein said frame is enclosed about three of the four lateral side edges, said first edge having a rectangular opening which provides access to an interior portion of the frame, wherein said second edge includes a handle, wherein said handle includes a C-shaped portion extending outwardly and away from said second edge, said C-shaped portion having two attachment members which are in abutting engagement with the second edge, wherein said frame further includes a vertical element and a horizontal element, wherein said vertical element extends from a bottom edge of the frame and extends toward the top proximal edge of the frame, wherein said horizontal element extends from said second edge and terminates at an opposing side edge being parallel to the second edge, wherein said vertical element overlaps the horizontal element such that a cross member is formed to define four open rectangular sections of the frame, wherein said vertical element is coupled to the horizontal element with a fastener;
   b) a replaceable filter media slidably introduced into the rectangular opening of the first edge to be secured into the interior portion of said frame, wherein said rectangular opening of the first edge cooperates with the shape of the replaceable filter media, said replaceable filter media being removable from the interior portion of said frame to aid a user in cleaning or replacing the replaceable filter media; and
   c) a housing with a rectangular shape defining a confined space, said confined space accessed from an opening along a side edge of the housing, wherein said frame having the replaceable media therein is slidably insertable into the housing to be enclosed in the confined space.

* * * * *